United States Patent [19]

Schuster

[11] Patent Number: 5,289,862
[45] Date of Patent: Mar. 1, 1994

[54] TREAD FOR A RIBBED PNEUMATIC TIRE HAVING HIGH DENSITY SIPING ZONES LOCATED IN THE RIB REGIONS

[75] Inventor: Daniel E. Schuster, North Royalton, Ohio

[73] Assignee: The Goodyear Tire & Rubber Company, Akron, Ohio

[21] Appl. No.: 922,368

[22] Filed: Jul. 29, 1992

Related U.S. Application Data

[63] Continuation of Ser. No. 672,244, Mar. 20, 1991.

[51] Int. Cl.⁵ .................................................. B60C 11/12
[52] U.S. Cl. .............................. 152/209 R; 152/DIG. 3
[58] Field of Search ........... 152/209 B, 209 R, 209 D, 152/209 A, DIG. 3; D12/141–145

[56] References Cited

U.S. PATENT DOCUMENTS

| | | | |
|---|---|---|---|
| D. 187,175 | 2/1960 | Smajd et al. | D12/141 |
| D. 222,322 | 10/1971 | Pope | D12/141 |
| D. 291,549 | 8/1987 | Neale | D12/143 |
| 2,261,025 | 10/1941 | Havens | 152/209 R |
| 3,402,751 | 9/1968 | Jacobs | 152/209 R |
| 3,405,753 | 7/1966 | Verdier | 152/209 |
| 3,550,665 | 9/1968 | Verdier | 152/209 |
| 3,698,462 | 10/1972 | Jacobs | 152/209 |
| 3,770,040 | 11/1973 | Cicco | 152/330 |
| 3,782,438 | 1/1974 | Mirtain | 152/209 R |
| 3,954,130 | 5/1976 | Verdier | 152/209 R |
| 4,266,592 | 5/1981 | Takigawa et al. | 152/209 R |
| 4,449,560 | 5/1984 | Tansei et al. | 152/209 R |
| 4,936,363 | 6/1990 | Schuster et al. | 152/209 R |

FOREIGN PATENT DOCUMENTS

| | | | |
|---|---|---|---|
| 0036002 | 2/1986 | Japan | 152/DIG. 3 |
| 0235205 | 10/1986 | Japan | 152/DIG. 3 |
| 0141806 | 6/1988 | Japan | 152/DIG. 3 |
| 0279905 | 11/1988 | Japan | 152/209 R |
| 535164 | 3/1941 | United Kingdom . | |
| 1254699 | 11/1971 | United Kingdom | 152/209 R |

Primary Examiner—Michael W. Ball
Assistant Examiner—Nancy T. Krawczyk
Attorney, Agent, or Firm—Bruce J. Hendricks

[57] ABSTRACT

The high density siping zones reduce rib edge erosion wear by creating a weakened zone without the tendency of tearing.

12 Claims, 4 Drawing Sheets

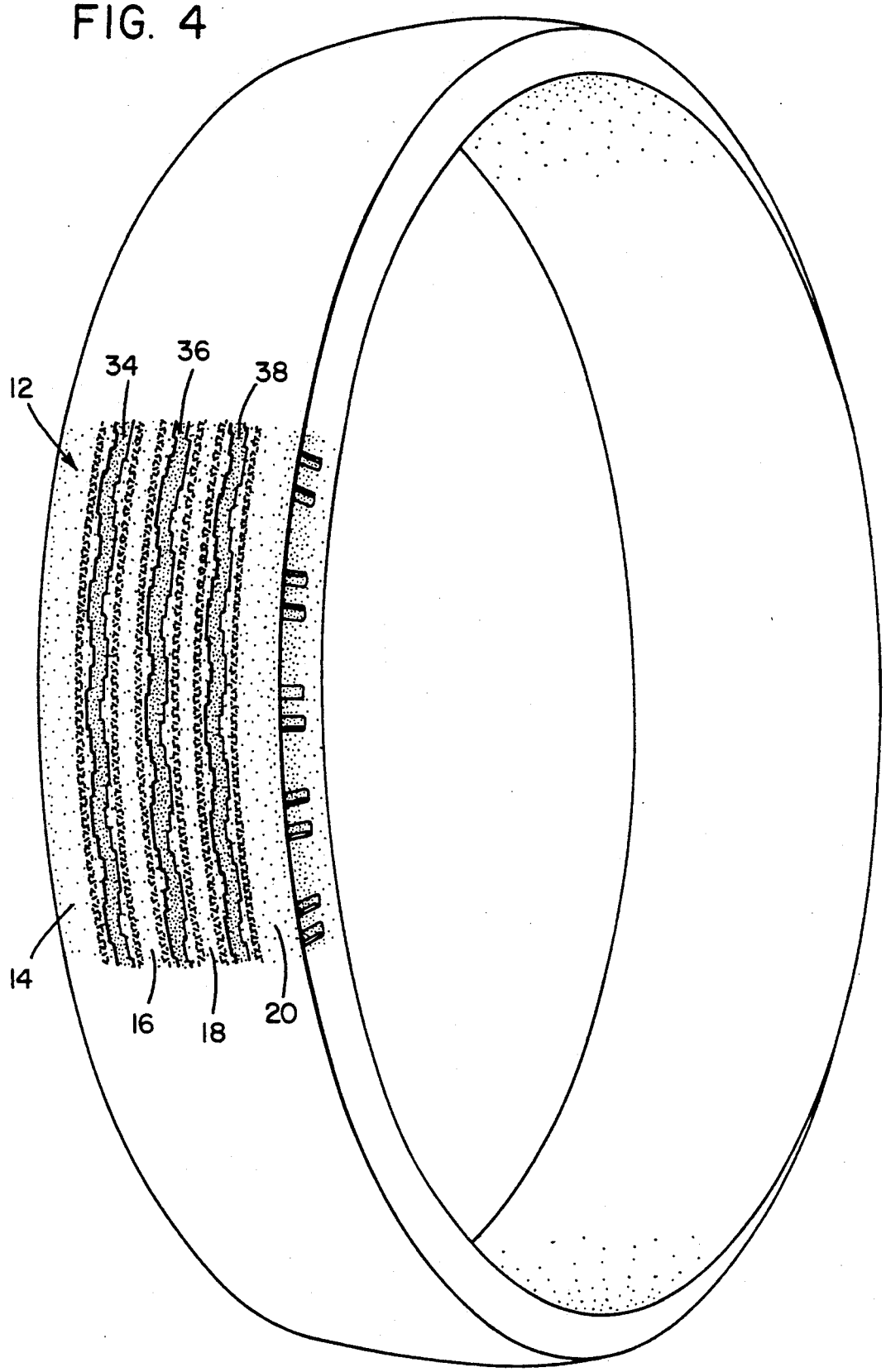

TREAD FOR A RIBBED PNEUMATIC TIRE HAVING HIGH DENSITY SIPING ZONES LOCATED IN THE RIB REGIONS

This is a continuation of copending application Ser. No. 07/672,244, filed on Mar. 20, 1991.

BACKGROUND OF THE INVENTION

The present invention relates to a tread for a pneumatic tire. Pneumatic tires are a laminated mechanical device of generally toroidal shape having beads and a tread and made of rubber, chemicals, fabric and steel or other materials. When mounted on the wheel of a motor vehicle, the tire through its tread provides traction and contains the fluid that sustains the vehicle load. In particular, the tread of the present invention is particularly suited for a radial-ply tire. The term "radial-ply" tire is intended to include a belted or circumferentially-restricted pneumatic tire in which the ply cords which extend from bead to bead are laid at cord angles between 65° and 90° with respect to the equatorial plane of the tire. The tread is provided with high density zones located in the shoulder region of the tread.

Heavy duty radial truck tires are often characterized by tread patterns utilizing ribs with projecting and reentrant portions in a generally zig-zag pattern. This tread pattern has proven advantageous for a variety of performance criteria. However, this tread pattern has also proven to be susceptible to a type of irregular wear known as "railway wear" or "river wear". River wear is wear in a circumferentially extending rib of a tire tread along the edge zones. The irregular wear spreads across the tread creating an unacceptable appearance.

In the prior art, tread designers have sought to eliminate or reduce river wear by placing narrow slots in the edges of the tread ribs as in U.S. Pat. No. 4,449,560. Tread designers also modified projecting portions of the tread rib to prevent the initiation of river wear, as in U.S. Pat. Nos. 4,266,592 and 4,200,134. While these techniques have been moderately successful, river wear continues to be a significant source of irregular wear for truck tires used extensively for long distance highway applications.

SUMMARY OF THE INVENTION

The present invention relates to a tread for a pneumatic tire, the tread when on the tire casing comprising circumferentially extending ribs, at least one of which contains a high density siping zone, wherein (a) each high density siping zone is circumferentially extending;

(b) each high density siping zone has an inside edge and an outside edge with a total width between said inside edge and outside edge ranging from about 1.4% to about 4.5% of the overall tread width;

(c) said outside edge of each high density siping zone is located from the nearest rib edge by a distance ranging from about 0.2% to about 1.9% of the overall tread width;

(d) from about 50% to about 80% of the surface area in each high density siping zone is ground contacting with the remaining percent of surface area in each high density siping zone is siping;

(e) no more than 50% of the siping within each high density siping zone is arranged in the circumferential direction; and (f) at least 75% of all sipes within the high density siping zone are arranged so that their end portions are laterally aligned with or overlap in the circumferential direction with an end portion of another sipe within the high density siping zone.

BRIEF DESCRIPTION OF THE DRAWINGS

FIG. 4 is a perspective view of a tread hoop utilizing the tread of the invention.

DESCRIPTION OF THE PREFERRED EMBODIMENT

In accordance with the present invention, the high density siping zones also referred to herein as high density zones located in the rib regions substantially reduces the axial extension of local wear to the tread crown. The high density zone acts to provide a breakwater against the spread of irregular wear known as "river wear". The high density zone also reduces the tendency for damage to the rib edge or unsightly edge wear.

Figure 1:
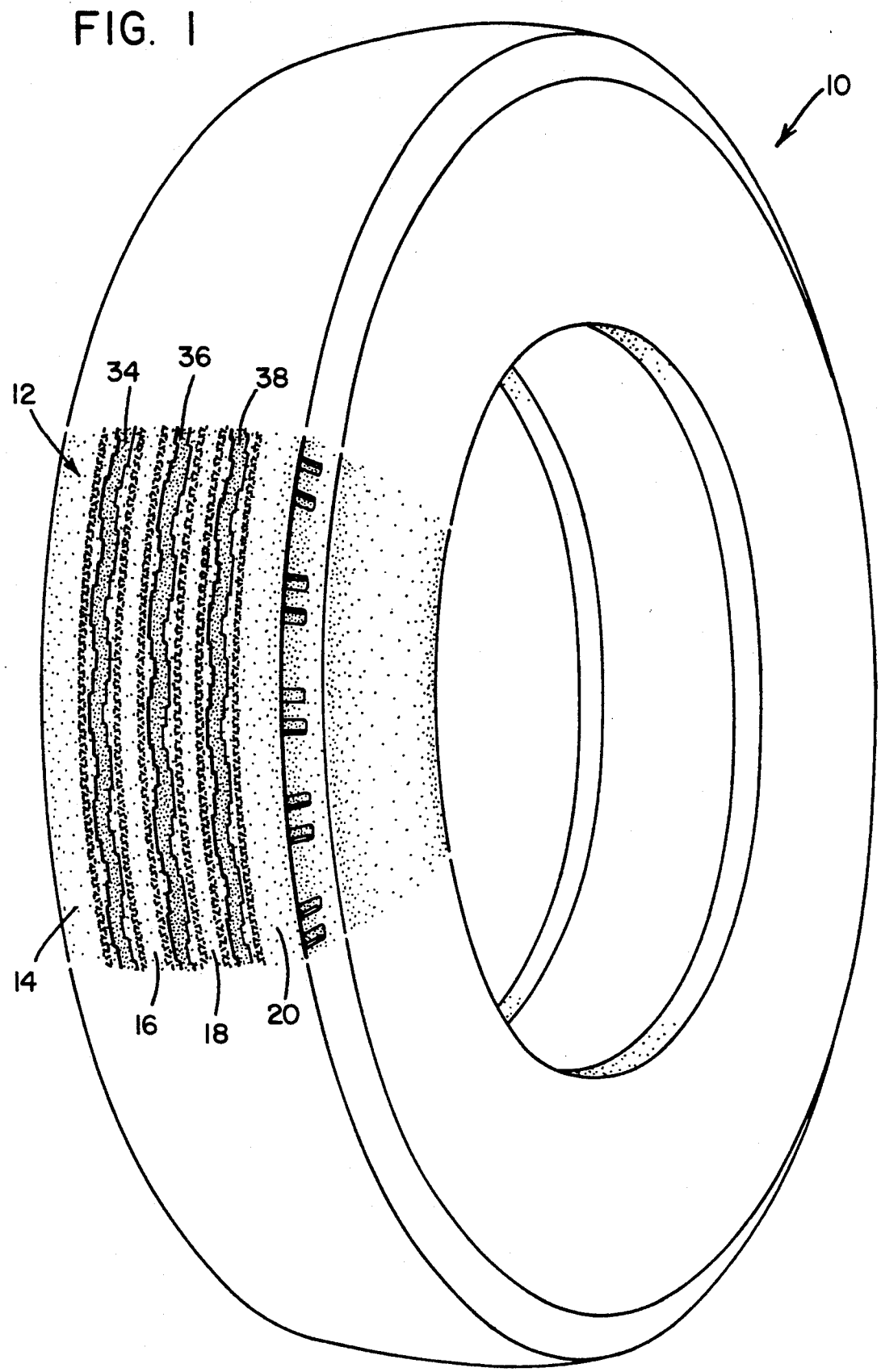
FIG. 1 is a perspective view of a tire utilizing the tread of the invention.
Figure 2:
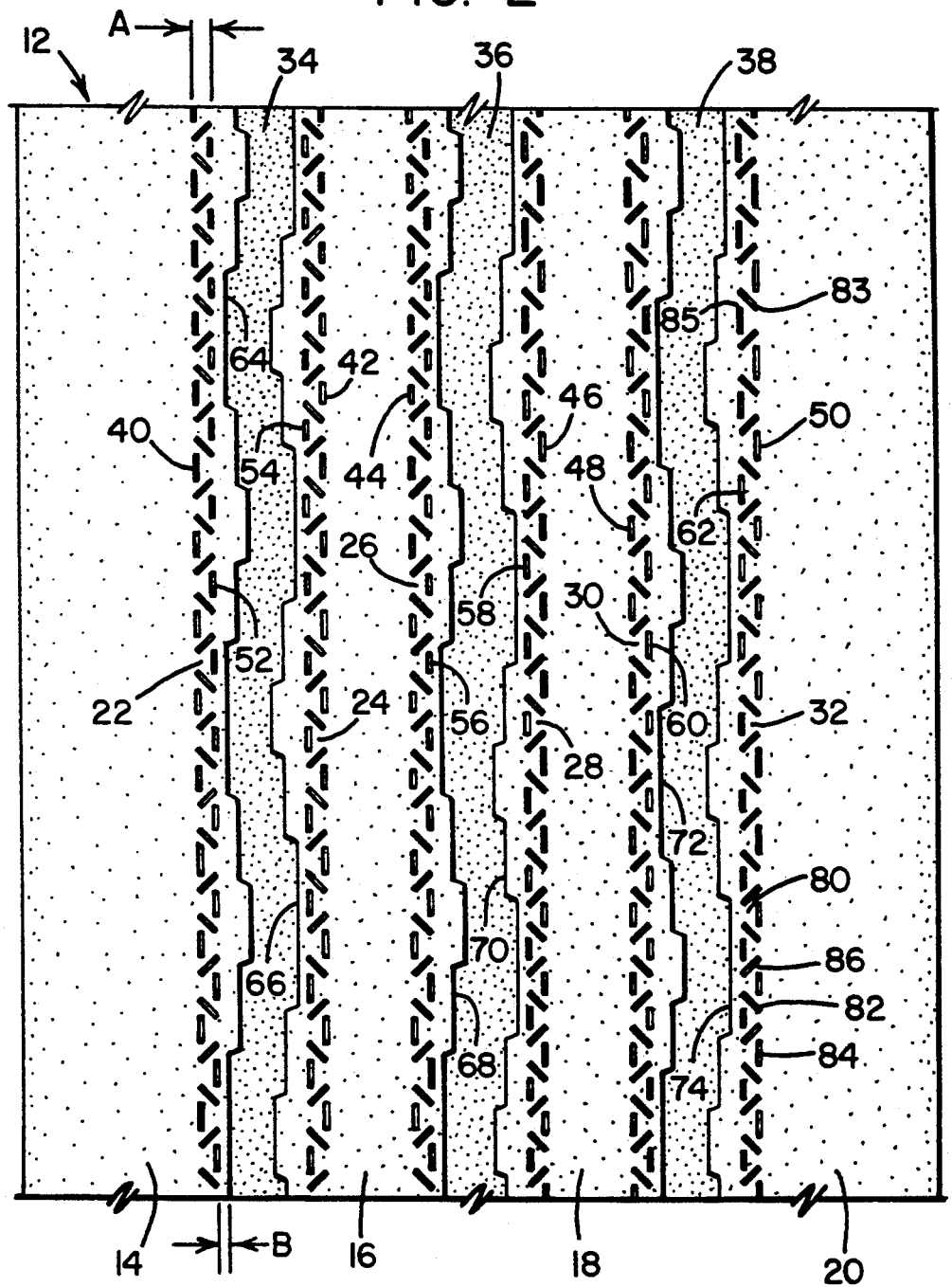
FIG. 2 is an enlarged plan view of a section of the tread of the tire shown in FIG. 1.

According to the embodiment of the invention represented if FIGS. 1 and 2, the tire 10 has a tread 12 incorporating the present invention. For purposes of the present invention "tread" is used herein to mean a molded rubber component which, when bonded to a tire casing includes that portion of the tire that comes into contact with the road when the tire is normally inflated and under normal load. Casing is intended to mean the carcass, belt structure, beads, sidewalls, and all other components of the tire excepting the tread and undertread. The casing may be new, unvulcanized rubber or previously vulcanized rubber to be fitted with the new tread.

While the invention may be practiced in the form of the tread on a new tire as shown in FIG. 1, it may also be practiced in the form of a tread 12 manufactured for retreading purposes as shown in FIG. 4. In a new tire application the tread 12 is attached to a tire casing which has not been vulcanized. The tire casing and the tread 12 are vulcanized together in a mold, creating a new tire. In a retreading application, the tread 12 can be "precured", that is, vulcanized prior to being bonded to the casing being retreaded. Alternatively, the tread pattern can be formed and the tread bonded to the casing in a single "mold-cure" retreading operation. For "precured" retreading purposes, the tread 12 may be in the form of a hoop as shown in FIG. 4 or maybe in the form of a flat slab which is then wrapped around the circumference of the tire casing.

In FIG. 2, the tread 12 is characterized by circumferentially extending ribs 14, 16, 18 and 20. Depending on the number of circumferentially extending ribs in the tread, the total width of each rib may vary from 13% to slightly less than 50% of the total tread width. Preferably each rib region ranges from about 18% to about 40% of the total tread width. Accordingly the tread may have from 2 to 7 circumferentially extending ribs with from 3 to 5 ribs being preferred. Generally speaking, the treads of the present invention have two shoulder ribs 14 and 20 and a plurality of center ribs 16 and 18. Preferably, each rib 14, 16, 18 and 20 contains a high density zone 22, 24, 26, 28, 30 and 32. For those ribs 16 and 18 other than the shoulder ribs 14 and 20, preferably there are two high density zones 24 and 26 and 28 and 30. The tread 12 will contain at least one and generally two or more grooves 34, 36 and 38 which define the lateral edges of accompanying ribs 14, 16, 18 and 20. For purposes herein, rib is intended to mean a circumferentially extending strip of rubber on the tread which is defined by at least one circumferential "wide groove" and either a second such groove or a lateral edge of the tread, the strip of rubber being laterally undivided by full-depth narrow or wide grooves.

"Groove" means an elongated void area in a tread that may extend circumferentially or laterally about the tread in a straight, curved, or zig-zag manner. Circumferentially and laterally extending grooves sometimes have common portions and may be subclassified as "wide", "narrow", or "slot", or "sipe". The slot or sipe typically is formed by steel blades inserted into a cast or machined mold or tread ring therefor. A slot" or sipe is a groove having a width in the range from about 0.2% to about 0.8% of the compensated tread width, whereas a "narrow groove" has a width in the range from about 0.8% to 3% of the compensated tread width and a "wide groove" has a width greater than 3% thereof. The "groove width" is equal to tread surface area occupied by a groove or groove portion, the width of which is in question, divided by the length of such groove or groove portion; thus, the groove width is its average width over its length.

Each high density zone 22, 24, 26, 28, 30 and 32 has an inside edge 40, 42, 44, 46, 48 and 50 and an outside edge 52, 54, 56, 58, 60 and 62. The inside edge 40, 42, 44, 46, 48 and 50 is defined as the edge of the sipe within the high density zone that is furthest from the nearest rib edge 64, 66, 68, 70, 72, and 74. The outside edge 52, 54, 56, 58, 60 and 62 is defined as the edge of the sipe within the high density zone that is the nearest to the closest rib edge 64, 66, 68, 70, 72, and 74. The total width A between an inside edge 40 and outside edge 52 of a high density zone 22 may range from about 1.4% to about 4.5% of the overall tread width. Preferably, the total width A between the inside edge 40 and outside edge 52 ranges from about 1.9% to about 3.5% of the overall tread width. For example, when the tread for the pneumatic tire has an overall width of 203.2 mm, (8 inches), the width of the high density zone may range from about 3 mm to about 9 mm. Preferably, the total width A may range from about 4 to about 7 mm.

The outside edge 52 of a high density zone 22 is located from the nearest rib edge 64 by distance B. The outside edge of each high density zone may be located from the nearest tread edge by a distance ranging from about 0.2% to about 1.9% of the overall tread width. Preferably, the distance B ranges from about 0.3% to about 0.6% of the overall tread width. When the tread for the pneumatic tire has an overall width of 203.2 mm (8 inches). The distance of B is generally from about 0.5 mm to about 4 mm. Preferably, the width of B is from about 0.6 mm to 1.3 mm.

Each high density zone 22, 24, 26, 28, 30, and 32 is circumferentially extending about the tread in a continuous manner. So long as the high density zone i-s circumferentially extending, the inside edges 40, 42, 44, 46, 48, and 50 and/or outside edges 52, 54, 56, 58, 60 and 62 may be undulated, zig-zag or be straight edged. Preferably, the inside edges are aligned in a relatively straight edge as well as the outside edges are so aligned. Therefore, the inside edge and outside edge is preferably parallel.

The high density zone is circumferentially extending and continuous as to the ground contacting area in the rib regions 14, 16, 18 and 20.

Each high density zone 32 has from about 50% to about 80% of the surface of the area 80 being ground contacting with the remaining percent of the area being siping 82. The ratio of ground contacting to the total is also known as "net to gross". Preferably, the percent of ground contacting area (net) ranges from about 60% to about 77%. The various percentages for the ground contacting area 80 is also known as the footprint, contact patch or area of contact. The percent of ground contact surface area is measured when the tread 12 is on a flat surface at zero speed and under normal load and pressure.

As can be appreciated by one skilled in the art, the width of the siping 82 within a given high density zone 32 will effect the "net to gross". For example, in the embodiment illustrated in FIG. 2, when the high density zone has a total width of 4 mm, and the width of each sipe is 0.76 mm the net to gross will be 77%. When the width of each sipe is 1 mm, the net to gross will be 69%. When the width of each sipe is 1.27 mm, the net to gross will be 62%. When the width of each sipe is 1.52 mm, the net to gross will be 54%.

No more than 50% of the siping 82 is arranged in a circumferential direction. Preferably, from about 30 to 50% of the siping 82 is arranged in a circumferential direction. As can be seen in FIGS. 1 and 2, 50% of the siping 84 is in a circumferential direction whereas 50% of the siping 86 and 82 is not in the circumferential direction.

At least 75% of all sipes within the high density zone are arranged so that their end portions 83 overlap in the circumferential direction with an end portion 85 of another sipe within the high density zone. End portion means the outermost point of a sipe measured in the circumferential direction from the center point of a sipe. In another embodiment, later shown in FIG. 3, at least 75% of all sipes within the high density zone are arranged so that their end portions are laterally aligned with an end portion of another sipe with the high density zone. Preferably, from about 80% to 100% of all sipes within the high density zone are laterally aligned with, or overlap in the circumferential direction with, an end portion of another sipe within the high density zone.

The siping 82 generally has a depth ranging from about 30% to 100% of the depth of any grooves 34, 36, and 38. Preferably the depth of the siping 82 ranges from about 50% to about 90% of the depth of any grooves 34, 36 and 38.

The remaining features of the tread depicted in FIGS. 1 and 2 illustrate those features conventional to those skilled in the art including an undulated rib edge 64.

Figure 3:
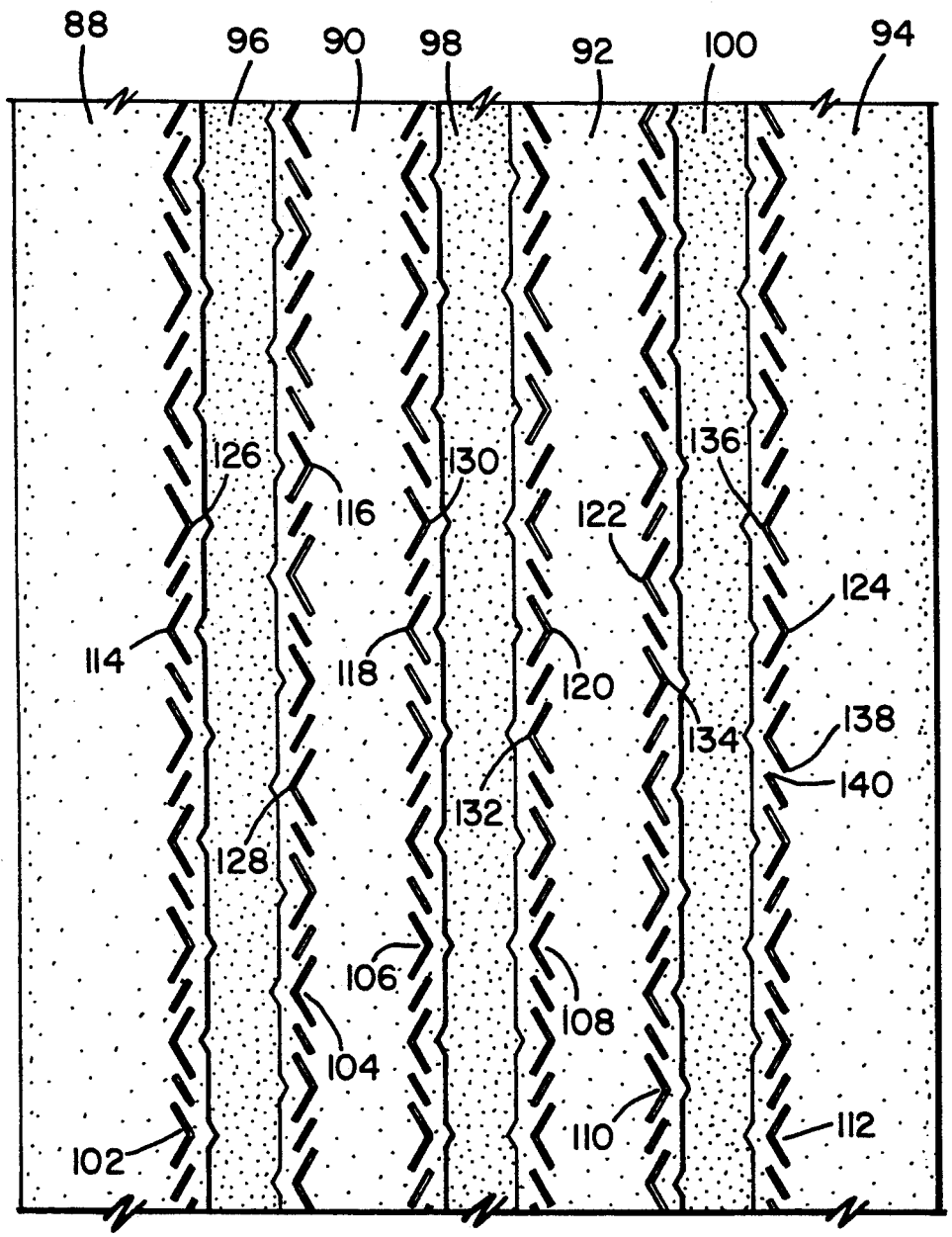
FIG. 3 is a plan view of another embodiment of the invention.

FIG. 3 illustrates another embodiment of the present invention. In FIG. 3 the tread is characterized by a plurality of shoulder ribs 88 and 94. The tread has three grooves, 96, 98 and 100 further defining two circumferentially extending ribs 90 and 92. Each high density zone 102, 104, 306, 108, 110 and 112 has an inside edge 114, 116, 118, 120, 122 and 124 and an outside edge 126, 128, 130, 132, 134 and 136.

In FIG. 3, the end portion of a sipe 138 within high density zone 112 is laterally aligned with an end portion of another sipe 140 within the high density zone 112.

What is claimed is:

1. A tread for a ribbed pneumatic tire, the tire tread when on the tire casing comprising at least two circumferentially extending shoulder ribs and at least one center rib wherein each center rib contains two high density siping zones, wherein
   (a) each high density siping zone is circumferentially extending;
   (b) each high density siping zone has an inside edge and an outside edge with a total width between said inside edge and outside edge ranging from about 1.4% to about 4.5% of the overall tread width and said inside edge and outside edge are straight edged and parallel to each other;
   (c) said outside edge of each high intensity siping zone is located from the nearest rib edge by a distance ranging from about 0.2% to about 1.9% of the overall tread width;
   (d) from about 50% to about 80% of the surface area in each high density siping zone is ground contacting with the remaining percent of area being siping;
   (e) no more than 50% of the siping within each high density siping zone is arranged in the circumferential direction; and
   (f) at least 75% of all sipes within the high density siping zone is arranged so that their end portions are laterally aligned with, or overlap in the circumferential direction with, an end portion of another sipe with the high density siping zone.

2. The tread according to claim 1 wherein said tread has from 3 to 7 circumferentially extending ribs.

3. The tread according to claim 1 wherein said total width between said inside edge and said outside edge ranges from about 1.9% to about 3.5% of the overall tread width.

4. The tread according to claim 1 wherein said outside edge of each high density siping zone is located from the nearest rib edge by distance ranging from about 0.3% to about 0.6% of the overall tread width.

5. The tread according to claim 1 wherein said high density siping zone has from about 60% to about 77% of the surface area being ground contacting.

6. The tread according to claim 1 where from 30% to 50% of the siping located within the high density siping zone are arranged in the circumferential direction.

7. The tread according to claim 1 wherein from about 80% to 100% of all sipes with each high density siping zone are laterally aligned with, or overlap in the circumferential direction with, an end portion of another sipe within the high density siping zone.

8. The tread according to claim 1 wherein at least 75% of all sipes within the high density siping zone are arranged so that their end portions are laterally aligned with an end portion of another sipe within the high density siping zone.

9. The tread according to claim 1 wherein at least 75% of all sipes within the high density siping zone are arranged so that their end portions overlap in the circumferential direction with an end portion of another sipe within the high density siping zone.

10. The tread of claim 1 wherein
    each high density siping zone has an inside edge and an outside edge with a total width between said inside edge and outside edge ranging from about 3 to about 9 mm; and
    said outside edge of each high density siping zone is located from the nearest tread edge by a distance ranging from about 0.5 mm to about 4 mm.

11. The tread according to claim 10 wherein said total width between said inside edge and said outside edge ranges from about 4 mm to 7 mm.

12. The tread according to claim 1 wherein said outside edge of each high density siping zone is located from the nearest tread edge by distance ranging from about 0.6 mm to about 1.3 mm.

* * * * *